June 2, 1925.
O. H. SCHMELTER
ICE CREAM DIPPER
Filed Oct. 17, 1923
1,540,089
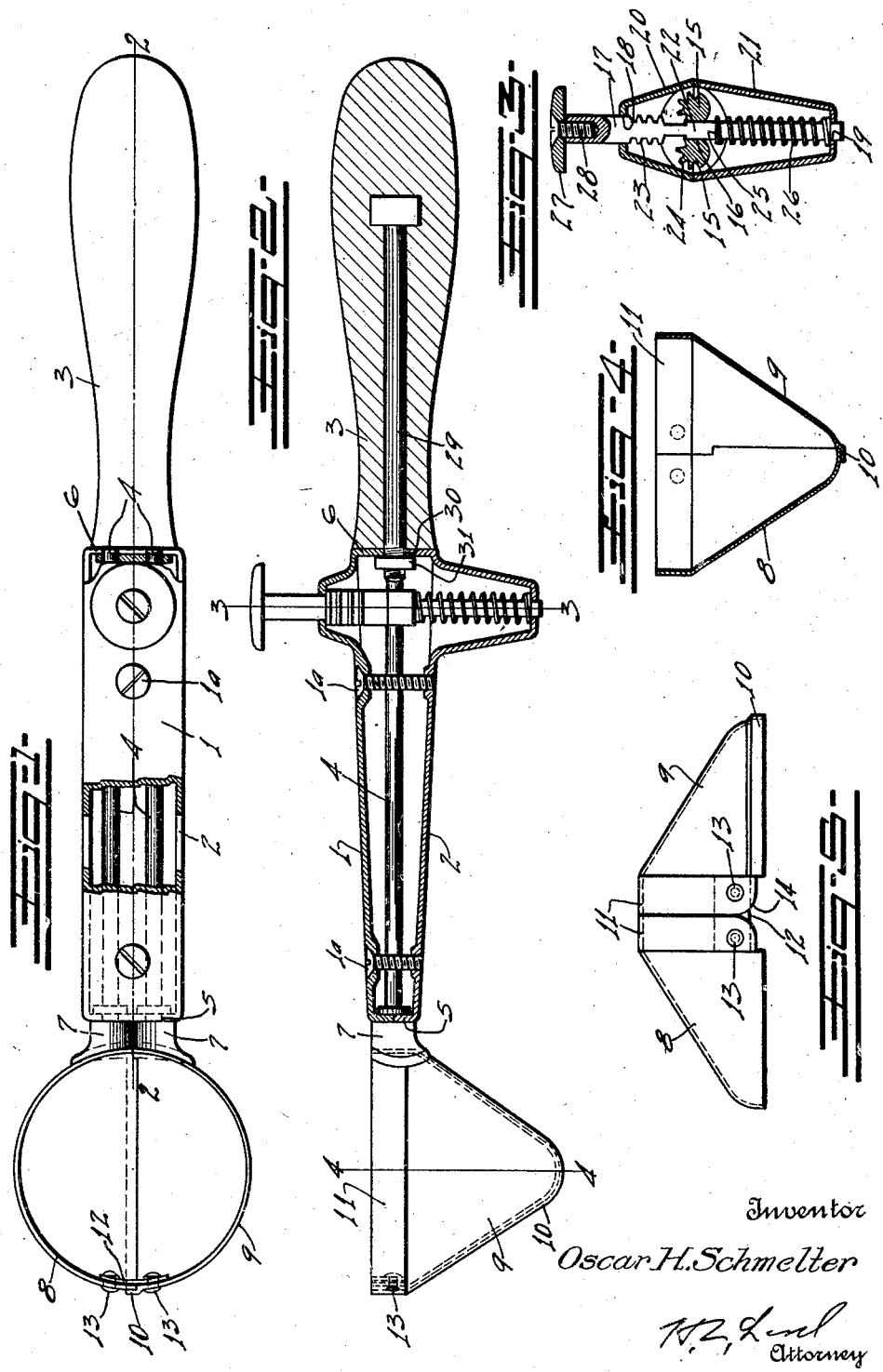
Inventor
Oscar H. Schmelter
Attorney Patented June 2, 1925.

1,540,089

UNITED STATES PATENT OFFICE.

OSCAR H. SCHMELTER, OF ERIE, PENNSYLVANIA.

ICE-CREAM DIPPER.

Application filed October 17, 1923. Serial No. 669,015.

*To all whom it may concern:*

Be it known that I, OSCAR H. SCHMELTER, a citizen of the United States, residing at Erie, in the county of Erie and State of Pennsylvania, have invented new and useful Improvements in Ice-Cream Dippers, of which the following is a specification.

The dipper of this invention is designed to dip cream for general use but is particularly advantageous in dipping cream for use with cones. As ordinarily practiced the cream is scooped with a dipper and is discharged by a wiping blade into the cone. With such a dipper the cream entering the cone is not formed to conform to the cone and there is quite a wide variation in the amount of cream delivered to the cone. With the present invention the cream is discharged in the form of a cone so as to nicely conform to the cone shape and gives a measured quantity for each cone. Details of the construction and other features of the invention will appear from the specification and claims.

The invention is illustrated in the accompanying drawings as follows:—

Fig. 1 shows a plan view of a dipper.

Fig. 2 a side elevation, partly in section, on the line 2—2 in Fig. 1.

Fig. 3 a section on the line 3—3 in Fig. 2.

Fig. 4 a section on the line 4—4 in Fig. 2.

Fig. 5 an end elevation of the dipper showing the dipper sections in open position.

The dipper is mounted on a two-part shank formed of two walls 1 and 2, these shank parts being secured together by screws 1ª. The shank is provided with a projecting handle 3.

Parallel shafts 4 extend through the shank, the front ends being journaled in ends 5 of the shank and the rear ends extending into a rear face 6.

Hubs 7 are formed on the front ends of the shafts and dipper sections 8 and 9 are mounted on the hubs, the section 9 having an overlapping lip 10 so as to thoroughly seal the sections when they are closed. The upper edges of sections form a flange 11 when closed forming a circle, or cutting edge for the cream.

A hinge plate 12 connects the outer ends of the sections by means of hinge pins or rivets 13, these pins being in alinement with the shafts 4. The edge of the dipper adjacent to the hinge is cut away at 14 so as to permit of the swinging of the sections relatively to each other as in closed position as shown in Figs. 1, 2 and 4 and in open position as shown in Fig. 5.

The shafts are rocked preferably by the following mechanism: Each shaft is provided with a small pinion 15. Each pinion is provided with a small flat surface 16. A push pin 17 is slidingly mounted in openings 18 and 19 in housings 20 and 21 respectively, the housings being formed in the shank parts 1 and 2. The push pin has a portion 22 adapted to operate between the flat surface 16 to lock the pinions 15 in position to lock the shafts 4 with the sections 8 and 9 in closed position so that with the push pin in its upper position as shown in Fig. 3 the dipper sections are closed and locked closed. Rack teeth 23 are formed on the pin 17 above the flat surface 22 and these are adapted to engage teeth 24 of the pinions 15 to rock the shaft as the push pin 17 is depressed. A shoulder 25 is formed below the flat surfaces 22 on the pin 17 and a spring 26 is arranged around the pin engaging the shoulder and seating on the bottom of the housing 21. This yieldingly holds the push pin in its upper position and in position to lock the dipper sections in closed position.

A handle 27 is secured to the upper end of the pin 17 by a screw 28.

The handle 3 has a bolt 29 embedded in it which extends through an opening 30 in the ends of the shanks 1 and 2 and into a plate 31, the plate extending across the rear of the shank and having openings receiving the shafts 4 and assisting in forming bearings for these shafts.

In the operation of the dipper, a quantity of cream is taken by the ordinary dipping action filling the dipper with a slight surplus extending above the dipper. The dipper is then held over the cone, the push pin depressed, thus opening the dipper sections. As the dipper sections swing the circular edges 11 shave or cut off the surplus at the top of the mass giving it a dome-shape. As this clipping action is completed by bringing the edges 11 together as shown in Fig. 5 the cream is dropped with a cone-shaped bottom into the cone.

What I claim as new is:—

1. In an ice cream dipper, the combination of two hinged dipper sections having top cutting edges; and means for opening the sections to discharge the cream and swinging the top edges together to cut the surplus cream from the cream discharged.

2. In an ice cream dipper, the combination of two dipper sections; rocking shafts on which the sections are mounted; means for rocking the shafts; and a hinged plate at the outer end of the dipper sections, said plate being pivotally connected with the sections with pivots in line with the shafts.

3. In an ice cream dipper, the combination of two dipper sections; rocking shafts on which the sections are mounted; means for rocking the shafts comprising pinions on the shafts, and a push pin having oppositely placed racks operating on the pinions; and a handle in which the shafts are journaled having guides for the push pin.

4. In an ice cream dipper, the combination of two dipper sections; rocking shafts on which the sections are mounted; and means for rocking the shafts comprising pinions on the shafts the pinions having locking surfaces thereon, and racks operating the pinions, said racks having locking surfaces operating with the locking surfaces of the pinions to lock the dipper sections in closed position.

5. In an ice cream dipper, the combination of two dipper sections; rocking shafts on which the sections are mounted; and means for rocking the shafts comprising pinions on the shafts, said pinions having locking surfaces, and a push pin having opposing racks operating on the pinions, said push pin having the locking surfaces operating with the locking surfaces of the pinions to lock the dipper sections in closed position.

6. In an ice cream dipper, the combination of two dipper sections; rocking shafts on which the sections are mounted; means for rocking the shafts, comprising pinions on the shafts, a push pin having opposingly placed racks operating on the pinions, and a spring returning the push pin; and a handle in which the shafts are journaled having guides for the push pin and a spring socket in which the spring is arranged.

7. In an ice cream dipper, the combination of two dipper sections; shafts on which the sections are mounted; a two-part shank in which the shafts are mounted, said shank forming a housing for the shafts; and a handle secured to the shank.

8. In an ice cream dipper, the combination of two dipper sections; shafts on which the sections are mounted; a two-part shank in which the shafts are mounted, said shank forming a housing for the shafts; and means mounted within the shank for operating the shafts.

9. In an ice cream dipper, the combination of two dipper sections; shafts on which the sections are mounted; a two-part shank in which the shafts are mounted, said shank forming a housing for the shafts; a plate within the shank having journals to the shaft; and a handle secured to the shank having a bolt extending into the plate.

In testimony whereof I have hereunto set my hand.

OSCAR H. SCHMELTER.